(12) United States Patent
Yamazaki et al.

(10) Patent No.: US 7,871,540 B2
(45) Date of Patent: Jan. 18, 2011

(54) POLYMERIZABLE LIQUID CRYSTAL COMPOSITION

(75) Inventors: Osamu Yamazaki, Kitaadachi-gun (JP); Hiroshi Hasebe, Kitaadachi-gun (JP); Kiyofumi Takeuchi, Kitaadachi-gun (JP)

(73) Assignee: DIC Corporation, Tokyo (JP)

( * ) Notice: Subject to any disclaimer, the term of this patent is extended or adjusted under 35 U.S.C. 154(b) by 163 days.

(21) Appl. No.: 12/279,280

(22) PCT Filed: Feb. 16, 2007

(86) PCT No.: PCT/JP2007/052836

§ 371 (c)(1), (2), (4) Date: Aug. 13, 2008

(87) PCT Pub. No.: WO2007/094450

PCT Pub. Date: Aug. 23, 2007

(65) Prior Publication Data

US 2009/0050844 A1    Feb. 26, 2009

(30) Foreign Application Priority Data

Feb. 17, 2006   (JP) .............................. 2006-040774

(51) Int. Cl.
  *C09K 19/38* (2006.01)
  *C09K 19/54* (2006.01)
  *C09K 19/30* (2006.01)
  *C09K 19/32* (2006.01)
  *C09K 19/34* (2006.01)
  *C09K 19/20* (2006.01)

(52) U.S. Cl. ............... 252/299.01; 252/299.5; 252/299.61; 252/299.62; 252/299.63; 252/299.66; 252/299.67; 428/1.1

(58) Field of Classification Search .................. 428/1.1; 252/299.01, 299.5, 299.61, 299.62, 299.63, 252/299.66, 299.67
See application file for complete search history.

(56) References Cited

U.S. PATENT DOCUMENTS

| 5,863,457 | A | * | 1/1999 | Hasebe et al. | 252/299.01 |
| 5,995,184 | A |   | 11/1999 | Chung et al. | |
| 6,582,626 | B2 | * | 6/2003 | Hasebe et al. | 252/299.64 |
| 6,599,443 | B1 |   | 7/2003 | Sharples et al. | |
| 6,730,241 | B2 | * | 5/2004 | Obi et al. | 252/299.67 |
| 2003/0085377 | A1 |   | 5/2003 | Dunn et al. | |

FOREIGN PATENT DOCUMENTS

| JP | 2000-034251 A | 2/2000 |
| JP | 2000-98133 A | 4/2000 |
| JP | 2000-105315 A | 4/2000 |
| JP | 2002-62533 A | 2/2002 |
| JP | 2003-105030 A | 4/2003 |
| JP | 2005-272561 A | 10/2005 |

OTHER PUBLICATIONS

International Search Report of PCT/JP2007/052836, date of mailing Mar. 27, 2007.

* cited by examiner

*Primary Examiner*—Shean C Wu
(74) *Attorney, Agent, or Firm*—Westerman, Hattori, Daniels & Adrian, LLP

(57) ABSTRACT

A polymerizable liquid crystal composition of the present invention includes a compound including a repeated unit represented by a general formula (I)

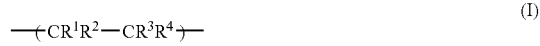

(wherein $R^1$, $R^2$, $R^3$, and $R^4$ each independently represents a hydrogen atom, a halogen atom, or a hydrocarbon group having 1 to 20 carbon atoms, and one or more of hydrogen atoms in the hydrocarbon group may be substituted by the halogen atoms.), in which a weight average molecular weight is 100 or more.

13 Claims, No Drawings

POLYMERIZABLE LIQUID CRYSTAL COMPOSITION

TECHNICAL FIELD

The present invention relates to a polymerizable liquid crystal composition that is useful as a component of an optically anisotropic medium used for an optical compensator such as a liquid crystal display, and an optically anisotropic medium formed from a polymer of the composition.

BACKGROUND ART

A polymerizable liquid crystal composition is useful as a component of an optically anisotropic medium, which is used, for example, as a phase difference film in various liquid crystal displays. A polymerizable liquid crystal composition is coated on a substrate, and is cured by irradiating it with radiation under the aligned condition due to an alignment layer, etc, to thereby obtain a phase difference film. However, in the case where a polymerizable liquid crystal composition is coated on a substrate, a tilt angle to an air interface occurs to an extent. Therefore, it is desired to reduce a tilt angle in order to satisfy optical properties required for a specific phase difference film.

As a method of reducing the aforementioned tilt angle, a method of adding a surfactant or a polymerizable surfactant in a polymerizable liquid crystal composition has been proposed (see Patent Reference 1, 2, and 3). Meanwhile, a method of incorporating a phase difference film in a liquid crystal cell of a liquid crystal display has attracted attention for the purpose of reduction in thickness, weight, and cost. In this case, there is a problem that impurities in the film are likely to have an adverse effect on a liquid crystal.

In the case where a surfactant is contained in a polymerizable liquid crystal composition, it is possible to achieve the purpose of reducing a tilt angle. However, in the case where a phase difference film is incorporated in a liquid crystal cell, because a surfactant chemical-structurally has a highly polar portion, a voltage-holding ratio of a liquid crystal deteriorates due to the contamination of a surfactant. In addition, a laminated film is difficult to form due to nonadhesive property and water and oil repellent properties which a surfactant possesses. In addition, in the case where a long-chain perfluoroalkyl sulfonamide derivative is used as a surfactant (see Patent Reference 3), because this compound has concerns for environmental toxicity, there is a problem for the use in a liquid crystal display.

As described above, a polymerizable liquid crystal composition has been desired, which has properties including no deterioration of a voltage-holding ratio of a liquid crystal display and easiness of forming a laminated film, and an effect of reducing a tilt angle to an air interface in the case where an optically anisotropic medium is prepared.

[Patent Reference 1]
Japanese Unexamined Patent Application, First Publication No. 2000-105315

[Patent Reference 2]
Japanese Unexamined Patent Application, First Publication No. 2003-105030

[Patent Reference 3]
Japanese Unexamined Patent Application, First Publication No. 2000-98133

DISCLOSURE OF INVENTION

An object of the present invention is to provide a polymerizable liquid crystal composition which has an effect of reducing a tilt angle to an air interface in the case where the polymerizable liquid crystal composition is coated to a substrate, and properties including no deterioration of a voltage-holding ratio of a liquid crystal display and easiness of forming a laminated film in the case where an optically anisotropic medium that is a cured material of polymerizable liquid crystal composition is incorporated inside a liquid crystal cell.

As a result of earnest investigation to solve the above problems, the compound was found, which is added to a polymerizable liquid crystal composition so as to efficiently reduce a tilt angle in an interface, and the present invention has been completed. The present invention provides a polymerizable liquid crystal composition including a compound including a repeated unit represented by a general formula (I)

(I)

(wherein $R^1$, $R^2$, $R^3$, and $R^4$ each independently represents a hydrogen atom, a halogen atom, or a hydrocarbon group having 1 to 20 carbon atoms, and one or more of hydrogen atoms in the hydrocarbon group may be substituted by the halogen atoms.), in which a weight average molecular weight is 100 or more. Also, the present invention provides an optically anisotropic medium formed from a polymer of the composition.

A polymerizable liquid crystal composition of the present invention has an effect of reducing a tilt angle to an air interface; therefore, it is useful for a material of an optically anisotropic medium. Also, a polymerizable liquid crystal composition of the present invention does not contain a polar material such as a surfactant; therefore, it has advantageous properties including no deterioration of a voltage-holding ratio of a liquid crystal display and easiness of forming a laminated film. A polymerizable liquid crystal composition of the present invention is preferably used for a material of an optically anisotropic medium incorporated inside a liquid crystal cell, and there is no risk of environmental toxicity.

BEST MODE FOR CARRYING OUT THE INVENTION

Hereinafter, the best mode of a polymerizable liquid crystal composition of the present invention is described. A polymerizable liquid crystal composition of the present invention includes a compound including a repeated unit represented by a general formula (I), in which the weight average molecular weight is 100 or more. The compound may be dissolved or dispersed in a polymerizable liquid crystal composition. In addition, solids can be precipitated as long as the precipitated solids are microparticles with such a particle diameter or less as to impair the properties of a polymerizable liquid crystal, but the states of dissolution and dispersion are preferable.

A compound presented by a general formula (I) is preferably made of only carbon atoms and hydrogen atoms, and is more preferably an aliphatic hydrocarbon. Preferable examples of the compound include polyethylene, polypropylene, polyisobutylene, paraffin, liquid paraffin, chlorinated polypropylene, chlorinated paraffin or chlorinated liquid paraffin.

The weight average molecular weight of the compound is preferably within a range of 200 to 1,000,000, more preferably within a range of 300 to 100,000, and particularly preferably within a range of 400 to 10,000.

Also, the compound is preferably contained in a polymerizable liquid crystal composition at 0.01 to 5 mass %, more preferably 0.05 to 2 mass %, and particularly preferably 0.1 to 1 mass %.

Polymerizable liquid crystal compounds in a polymerizable liquid crystal composition can be used without any particular limitation. As a polymerizable liquid crystal compound, a calamitic polymerizable liquid crystal compound and a discotic polymerizable liquid crystal compound is preferably used, and a calamitic polymerizable liquid crystal compound is particularly preferable.

Calamitic polymerizable liquid crystal compounds preferably include a compound represented by a general formula (II)

P-(Sp)$_m$-MG-R$^1$     (II)

(wherein P represents a reactive functional group; Sp represents a spacer group having 1 to 20 carbon atoms; m represents 0 or 1; MG represents a mesogenic group or a mesogenic supporting group; and R$^1$ represents a halogen atom, a cyano group, or an alkyl group having 1 to 25 carbon atoms that may be substituted with one or more of the halogen atoms or the cyano groups, in which one of CH$_2$ group, or two or more of the CH$_2$ groups that are not adjacent may be each independently substituted by —O—, —S—, —NH—, —N(CH$_3$)—, —CO—, —COO—, —OCO—, —OCOO—, —SCO—, —COS—, or —C≡C— in a manner where the oxygen atoms are not directly bonded, or R$^1$ represents a structure represented by a general formula (II-a)

-(Sp)$_m$-P     (II-a)

(wherein P represents the reactive functional group, Sp represents the spacer group having 1 to 20 carbon atoms, and m represents 0 or 1.).).

Moreover, it is more preferably to include the compound represented by the general formula (II) in which Sp represents an alkylene group (the alkylene group may be substituted with one or more of the halogen atoms or the cyano groups, in which one of the CH$_2$ group, or two or more of the CH$_2$ groups that are not adjacent may be each independently substituted by —O—, —S—, —NH—, —N(CH$_3$)—, —CO—, —COO—, —OCO—, —OCOO—, —SCO—, —COS—, or —C≡C— in a manner where the oxygen atoms are not directly bonded.); MG represents a structure represented by a general formula (II-b)

-Z0-(A1-Z1)$_n$-A2-Z2-A3-Z3-     (II-b)

(wherein A1, A2, and A3 each independently represents a 1,4-phenylene group, a 1,4-cyclohexylene group, a 1,4-cyclohexenyl group, a tetrahydropyran-2,5-diyl group, a 1,3-dioxan-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphtylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group, in which the 1,4-cyclohexylene group, the 1,2,3,4-tetrahydronaphthalene-2,6-diyl group, the 2,6-naphtylene group, the phenanthrene-2,7-diyl group, the 9,10-dihydrophenanthrene-2,7-diyl group, the 1,2,3,4,4a,9,10a-octahydrophenanthrene-2,7-diyl group, and the fluorene-2,7-diyl group may contain, as a substituent group, F, Cl, CF$_3$, OCF$_3$, a cyano group, an alkyl group, alkoxy group, alkanoyl group, or alkanoyloxy group which has 1 to 8 carbon atoms, or an alkenyl group, alkenyloxy group, alkenoyl group, or alkenoyloxy group which has 2 to 8 carbon atoms; Z0, Z1, Z2, and Z3 each independently represents —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, or a single bond; and n represents 0, 1, or 2.); and P represents a substituent group selected from the group consisting of substituent groups represented by a general formula (II-c), a general formula (II-d), and a general formula (II-e)

(II-c)

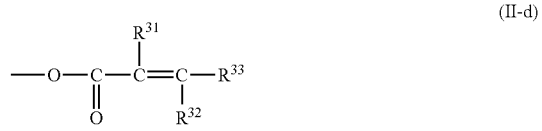

(II-d)

(II-e)

(wherein R$^{21}$, R$^{22}$, R$^{23}$, R$^{31}$, R$^{32}$, R$^{33}$, R$^{41}$, R$^{42}$, and R$^{43}$ each independently represents a hydrogen atom, a halogen atom, or an alkyl group having 1 to 5 carbon atoms, and n represents 0 or 1.).

Herein, it is preferable to use, as a specific example of a compound in a polymerizable liquid crystal composition, a compound represented by a general formula (III)

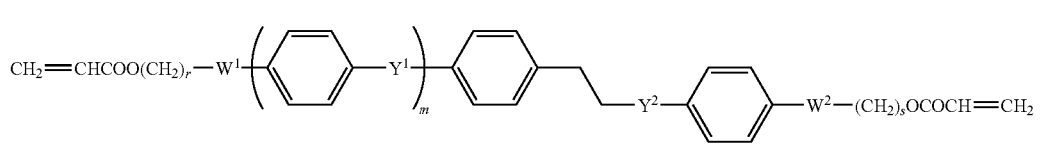

(wherein m represents 0 or 1, $W^1$ and $W^2$ each independently represents single bond, —O—, —COO—, or —OCO—; $Y^1$ and $Y^2$ each independently represents —COO— or —OCO—; and r and s each independently represents an integer of 2 to 18, and in the formula, the 1,4-phenylene group may be substituted with one or more of an alkyl group, alkoxy group, or alkanoyl group which has 1 to 7 carbon atoms, a cyano group, or a halogen atom.) because it is possible to obtain an optically anisotropic medium excellent in mechanical strength and heat resistance.

Also, it is preferable to use a compound represented by a general formula (IV)

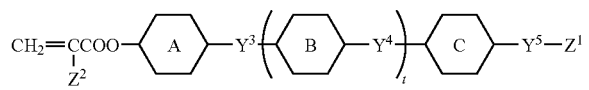

(wherein $Z^1$ represents a hydrogen atom, a halogen atom, a cyano group, or a hydrocarbon group having 1 to 20 carbon atoms; $Z^2$ represents a hydrogen atom or a methyl group; t represents 0 or 1; A, B, and C each independently represents a 1,4-phenylene group, a 1,4-phenylene group in which CH groups that are not adjacent are substituted by nitrogen, a 1,4-cyclohexylene group, a 1,4-cyclohexylene group in which one, or two $CH_2$ groups that are not adjacent are substituted by oxygen atoms or sulfur atoms, or a 1,4-cyclohexenylene group, and the 1,4-phenylene group in the formula may be substituted with one or more of an alkyl group, alkoxy group, or alkanoyl group which has 1 to 7 carbon atoms, a cyano group, or a halogen atom; $Y^3$ and $Y^4$ each independently represents a single bond, —$CH_2CH_2$—, —$CH_2O$—, —$OCH_2$—, —COO—, —OCO—, —C≡C—, —CH=CH—, —CF=CF—, —$(CH_2)_4$—, —$CH_2CH_2CH_2O$—, —$OCH_2CH_2CH_2$—, —CH=$CHCH_2CH_2$—, —$CH_2CH_2$CH=CH—, —CH=CHCOO—, —OCOCH=CH—, —$CH_2CH_2$COO—, —$CH_2CH_2$OCO—, —$COOCH_2CH_2$—, or —$OCOCH_2CH_2$—; and $Y^5$ represents single bond, —O—, —COO—, —OCO—, or —CH=CHCOO—.) because it is possible to reduce the viscosity of a polymerizable liquid crystal composition and the liquid crystal temperature range thereof to room temperature or around room temperature.

Also, it is preferable to use a compound represented by a general formula (V)

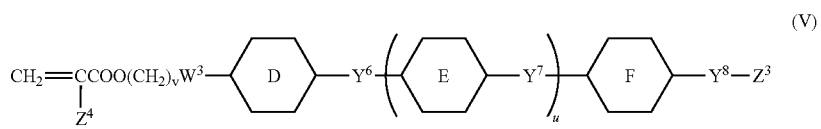

(wherein $Z^3$ represents a hydrogen atom, a halogen atom, a cyano group, or a hydrocarbon group having 1 to 20 carbon atoms; $Z^4$ represents a hydrogen atom or a methyl group; $W^3$ represents a single bond, —O—, —COO—, or —OCO—; v represents an integer of 2 to 18; u represents an integer of 0 or 1; D, E, and F each independently represents a 1,4-phenylene group, a 1,4-phenylene group in which CH groups that are not adjacent are substituted by nitrogen, a 1,4-cyclohexylene group, a 1,4-cyclohexylene group in which one, or two $CH_2$ groups that are not adjacent are substituted by oxygen atoms or sulfur atoms, or a 1,4-cyclohexenylene group, and these D, E, and F may be substituted with one or more of an alkyl group, alkoxy group, or alkanoyl group which has 1 to 7 carbon atoms, a cyano group, or a halogen atom; $Y^6$ and $Y^7$ each independently represents a single bond, —$CH_2CH_2$—, —$CH_2O$—, —$OCH_2$—, —COO—, —OCO—, —C≡C—, —CH=CH—, —CF=CF—, —$(CH_2)_4$—, —$CH_2CH_2CH_2O$—, —$OCH_2CH_2CH_2$—, —CH=$CHCH_2CH_2$—, —$CH_2CH_2$CH=CH—, —CH=CHCOO—, —OCOCH=CH—, —$CH_2CH_2$COO—, —$CH_2CH_2$OCO—, —$COOCH_2CH_2$—, or —$OCOCH_2CH_2$—; and $Y^8$ represents a single bond, —O—, —COO—, —OCO—, or —CH=CHCOO—.) because it is possible to adjust the liquid crystalline property without largely increasing the viscosity of a polymerizable liquid crystal composition.

Specific examples of the compound represented by the general formula (II) include the following.

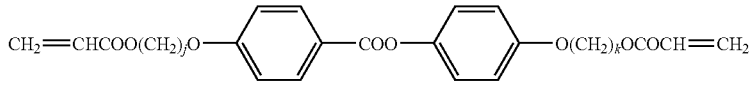
(II-1)
(II-2)
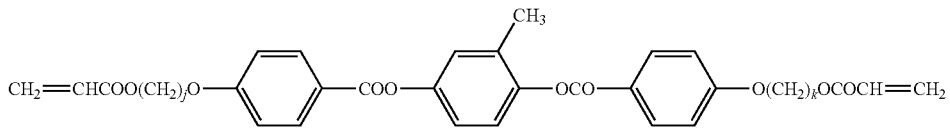
(II-3)
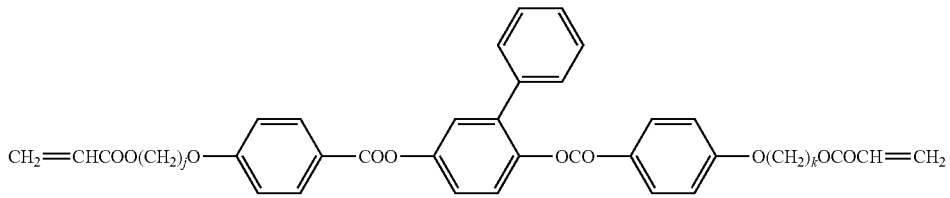
(II-4)
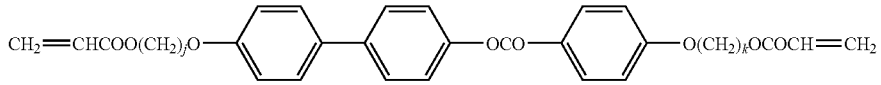
(II-5)
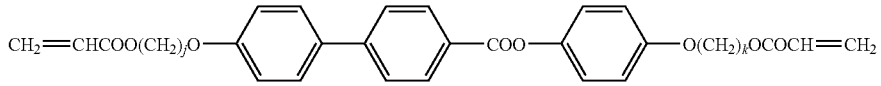
(II-6)
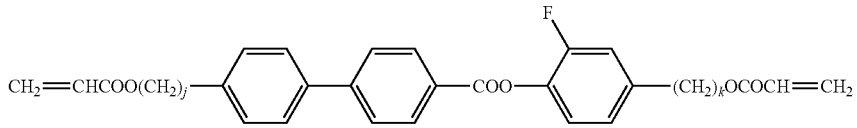
(II-7)
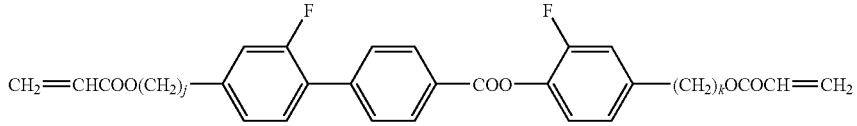
(II-8)
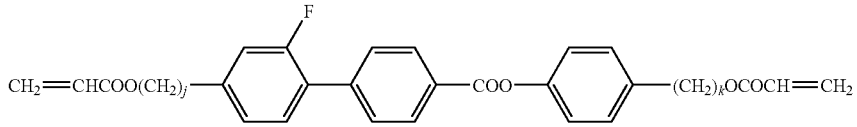
(II-9)
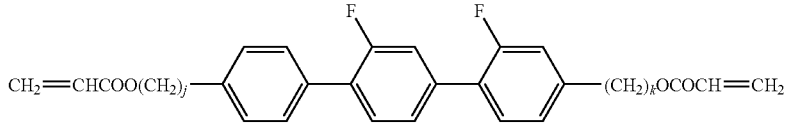
(II-10)
(wherein j and k each independently represents an integer of 2 to 18.)
Also, specific examples of the compound represented by the general formula (III) include the following.

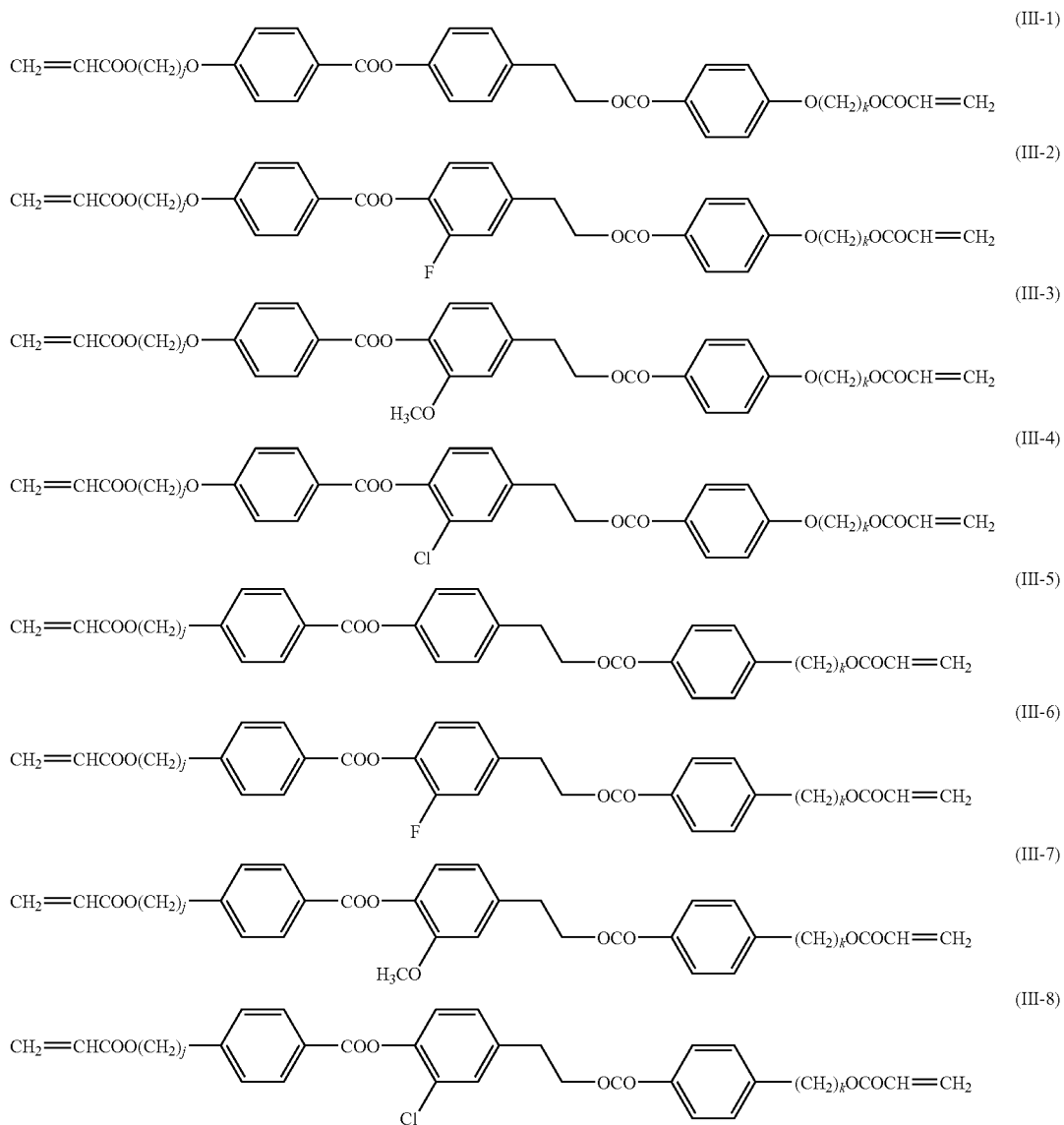
(wherein j and k each independently represents an integer of 2 to 18.)
Also, as a specific example of the compound represented by the general formula (IV), the structures and the phase transition temperatures of the compound are exemplified as follows.
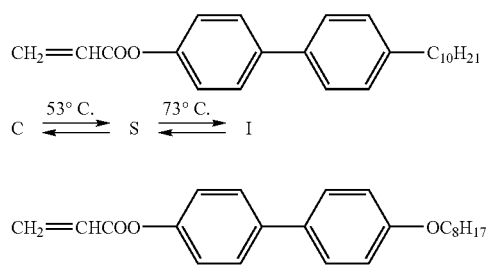
-continued
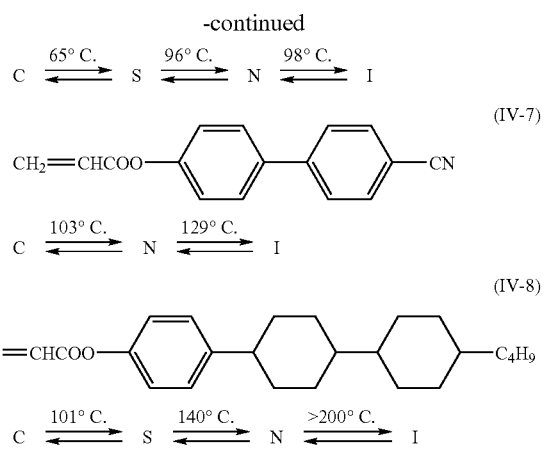

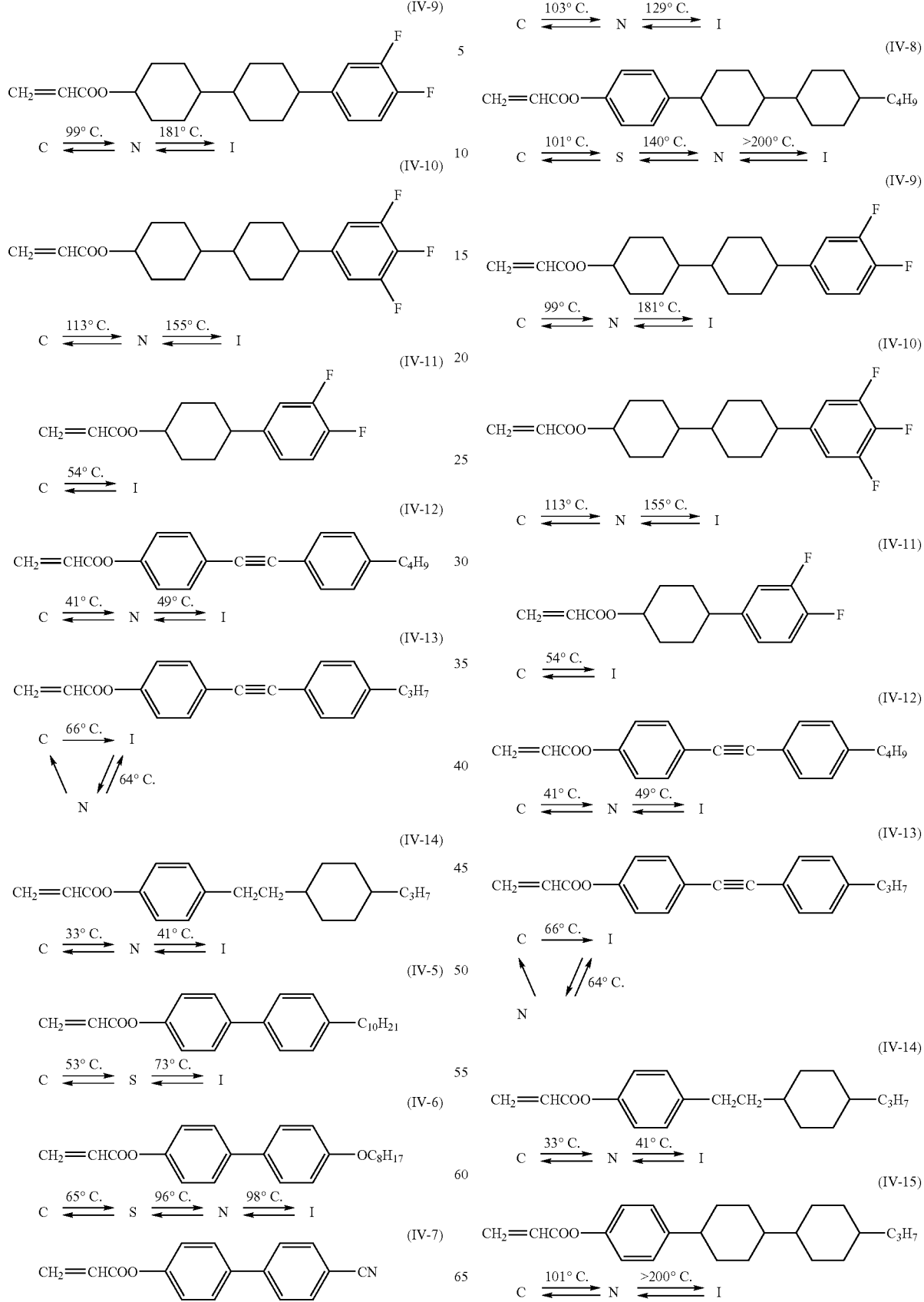

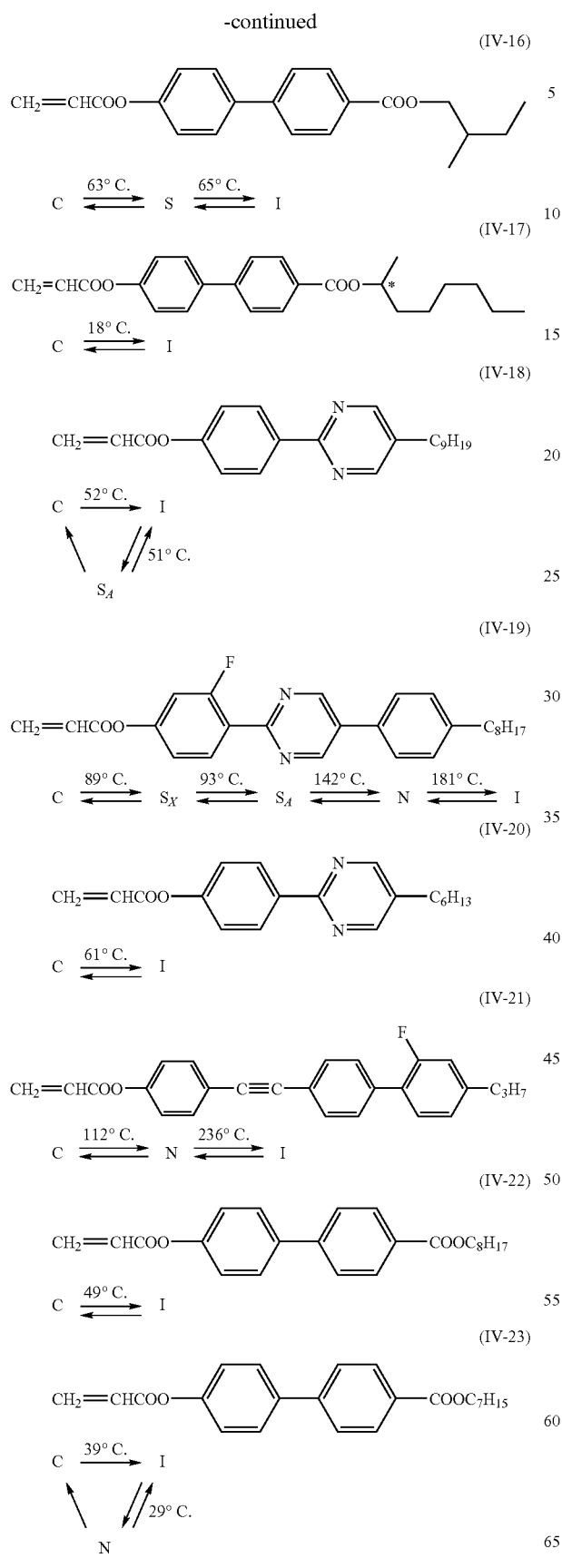
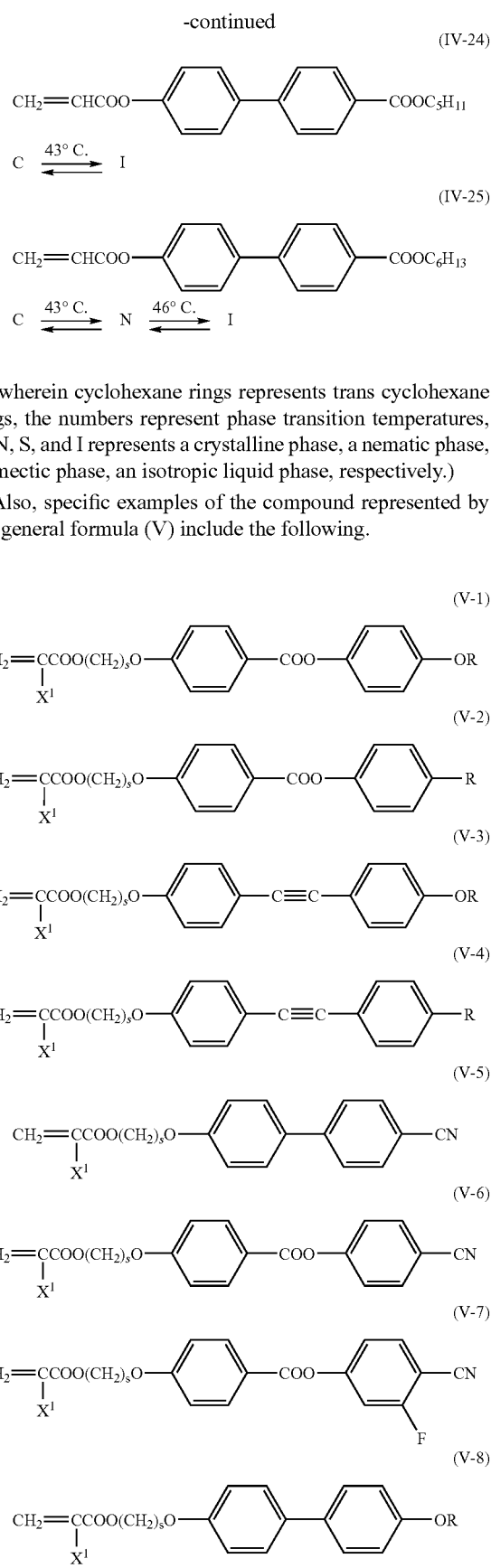
(wherein cyclohexane rings represents trans cyclohexane rings, the numbers represent phase transition temperatures, C, N, S, and I represents a crystalline phase, a nematic phase, a smectic phase, an isotropic liquid phase, respectively.)
Also, specific examples of the compound represented by the general formula (V) include the following.

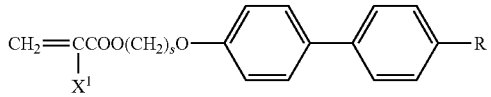

(V-9)

(wherein $X^1$ represents a hydrogen atom or a methyl group, and R represents an alkyl group having 1 to 20 carbon atoms.)

Also, a polymerizable liquid crystal composition of the present invention preferably includes a discotic liquid crystal compound, and the discotic liquid crystal compound preferably has a structure in which a main structure of the center of molecule is a benzene derivative, a triphenylene derivative, a tolxene derivative, a phthalocyanine derivative, or a cyclohexane derivative, and side chains, with which the main structure is radially substituted, are linear alkyl groups, linear alkoxy groups, or substitution benzoyloxy groups.

Of these, the discotic liquid crystal compound more preferably has a structure represented by a general formula (VI)

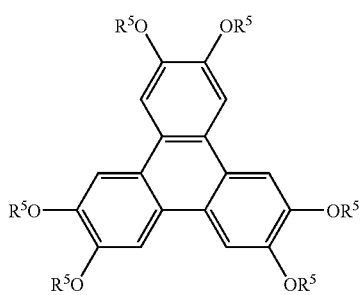

(VI)

(wherein $R^5$ each independently represents a substituent group represented by a general formula (VI-a).)

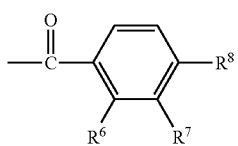

(VI-a)

(wherein $R^6$ and $R^{10}$ each independently represents a hydrogen atom, a halogen atom, or a methyl group, $R^8$ represents an alkoxy group having 1 to 20 carbon atoms, and a hydrogen atom in the alkoxy group may be substituted by a substituent group represented by a general formula (VI-b), a general formula (VI-c), or a general formula (VI-d))

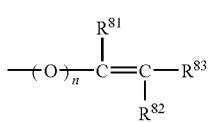

(VI-b)

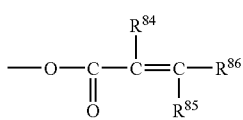

(VI-c)

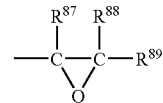

(VI-d)

(wherein $R^{81}$, $R^{82}$, $R^{83}$, $R^{84}$, $R^{85}$, $R^{86}$, $R^{87}$, $R^{88}$, and $R^{89}$ each independently represents a hydrogen atom, a halogen atom, or an alkyl group having 1 to 5 carbon atoms, and n represents 0 or 1.).

Also, in a general formula (VI), it is preferable that at lease one of $R^8$ represent an alkoxy group substituted with the substituent group represented by the general formula (VI-b), the general formula (VI-c), or the general formula (VI-d), and it is particularly preferably that all of $R^8$ represent the alkoxy group substituted with the substituent group represented by the general formula (VI-b), the general formula (VI-c), or the general formula (VI-d).

Moreover, it is particularly preferable that the general formula (VI-a) specifically contain a structure represented by a general formula (VI-e)

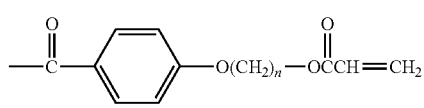

(VI-e)

(wherein n represents an integer of 2 to 9.).

The aforementioned polymerizable liquid crystal composition may be used in the state where it is dissolved in an organic solvent, etc. Preferable examples of an organic solvent include an alkyl-substituted benzene such as toluene, xylene, or cumene, propylene glycol monomethyl ether acetate, butyl acetate, and cyclohexanone. Moreover, to these solvents, dimethylformamide, γ-butyrolactone, N-methylpyrrolidinone, methyl ethyl ketone, or ethyl acetate, etc. can be added.

Also, the aforementioned polymerizable liquid crystal composition may include additives a polymerization inhibitor, a polymerization initiator, antioxidant, or a ultraviolet absorber in addition to a compound includes a repeated unit represented by the general formula (I), in which the weight average molecular weight is 100 or more.

EXAMPLES

Hereinafter is a further detailed description of the present invention with reference to examples. However, the present invention is not to be limited by these examples.

Regarding a tilt angle to an air interface, 0° is defined in the case where the long axis of a liquid crystal molecule is parallel to a substrate surface. Regarding the measurement of the tilt angle, the incident angle dependence of phase difference is measured using a He—Ne laser, and the tilt angle to an air interface is calculated using the fitting of simulation results.

Example 1

The polymerizable liquid crystal composition (A) containing 50 mass % of the compound represented by the formula (a) and 50 mass % of the compound represented by the formula (b) was prepared.

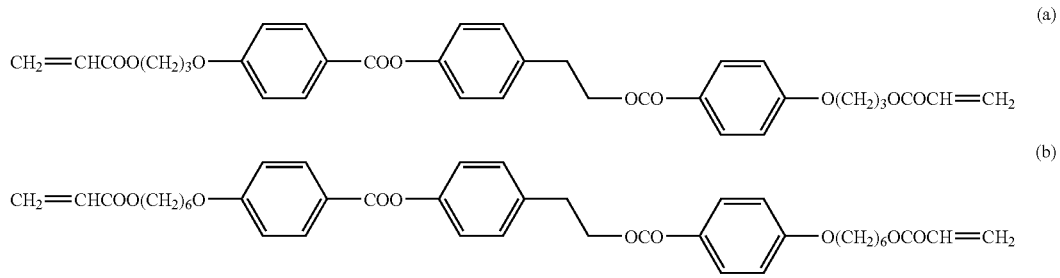

To 97.7 mass % of polymerizable liquid crystal composition (A), 2.0 mass % of the photopolymerization initiator Irgacure-651 (manufactured by Ciba Specialty Chemicals Inc.) and 0.3 mass % of polypropylene having a weight average molecular weight of 12,000 (manufactured by Sigma-Aldrich Co.) were added, to thereby prepare the polymerizable liquid crystal composition (A1) of the present invention. Subsequently, the xylene solution containing 33 mass % of the polymerizable liquid crystal composition (A1) was prepared. This xylene solution was spin-coated on the glass substrate with polyimide alignment layer (3,000 rpm, 30 seconds). Ultraviolet rays of 4 mW/cm$^2$ were irradiated to the spin-coated substrate in a nitrogen atmosphere for 120 seconds, to thereby cure the polymerizable liquid crystal composition (A1). Regarding the optically anisotropic medium obtained in the aforementioned method, the incident angle dependence of phase difference was measured, and the result showed that the tilt angle to an air interface was about 0°. Also, on the optically anisotropic medium obtained in the aforementioned method, the polymerizable liquid crystal composition (A1) was spin-coated (3000 rpm, 30 seconds), and ultraviolet rays of 4 mW/cm$^2$ were irradiated in a nitrogen atmosphere for 120 seconds, to thereby cure the polymerizable liquid crystal composition (A1). Then, the favorable laminated optically anisotropic medium having no eye hole was obtained.

Example 2

To 97.7 mass % of polymerizable liquid crystal composition (A), 2.0 mass % of the photopolymerization initiator Irgacure-651 (manufactured by Ciba Specialty Chemicals Inc.) and 0.3 mass % of polyisobutylene having a weight average molecular weight of 2,800 (manufactured by Scientific Polymer Products Inc.) were added, to thereby prepare the polymerizable liquid crystal composition (A2) of the present invention. Subsequently, the xylene solution containing 33 mass % of the polymerizable liquid crystal composition (A2) was prepared. This xylene solution was spin-coated on the glass substrate with polyimide alignment layer (3,000 rpm, 30 seconds). Ultraviolet rays of 4 mW/cm$^2$ were irradiated to the spin-coated substrate in a nitrogen atmosphere for 120 seconds, to thereby cure the polymerizable liquid crystal composition (A2). Regarding the optically anisotropic medium obtained in the aforementioned method, the incident angle dependence of phase difference was measured, and the result showed that the tilt angle to an air interface was about 0°. Also, on the optically anisotropic medium obtained in the aforementioned method, the polymerizable liquid crystal composition (A2) was spin-coated (3000 rpm, 30 seconds), and ultraviolet rays of 4 mW/cm$^2$ were irradiated in a nitrogen atmosphere for 120 seconds, to thereby cure the polymerizable liquid crystal composition (A2). Then, the favorable laminated optically anisotropic medium having no eye hole was obtained.

Example 3

To 97.7 mass % of polymerizable liquid crystal composition (A), 2.0 mass % of the photopolymerization initiator Irgacure-651 (manufactured by Ciba Specialty Chemicals Inc.) and 0.3 mass % of liquid paraffin (manufactured by Kanto Chemicals Co., Inc.) were added, to thereby prepare the polymerizable liquid crystal composition (A3) of the present invention. Subsequently, the xylene solution containing 33 mass % of the polymerizable liquid crystal composition (A3) was prepared. This xylene solution was spin-coated on the glass substrate with polyimide alignment layer (3,000 rpm, 30 seconds). Ultraviolet rays of 4 mW/cm$^2$ were irradiated to the spin-coated substrate in a nitrogen atmosphere for 120 seconds, to thereby cure the polymerizable liquid crystal composition (A3). Regarding the optically anisotropic medium obtained in the aforementioned method, the incident angle dependence of phase difference was measured, and the result showed that the tilt angle to an air interface was about 0°. Also, on the optically anisotropic medium obtained in the aforementioned method, the polymerizable liquid crystal composition (A3) was spin-coated (3000 rpm, 30 seconds), and ultraviolet rays of 4 mW/cm$^2$ were irradiated in a nitrogen atmosphere for 120 seconds, to thereby cure the polymerizable liquid crystal composition (A3). Then, the favorable laminated optically anisotropic medium having no eye hole was obtained.

Example 4

To 97.7 mass % of polymerizable liquid crystal composition (A), 2.0 mass % of the photopolymerization initiator Irgacure-651 (manufactured by Ciba Specialty Chemicals Inc.) and 0.3 mass % of chlorinated polypropylene having a weight average molecular weight of 100,000 (manufactured by Sigma-Aldrich Co.) were added, to thereby prepare the polymerizable liquid crystal composition (A4) of the present invention. Subsequently, the xylene solution containing 33 mass % of the polymerizable liquid crystal composition (A4) was prepared. This xylene solution was spin-coated on the glass substrate with polyimide alignment layer (3,000 rpm, 30 seconds). Ultraviolet rays of 4 mW/cm$^2$ were irradiated to the spin-coated substrate in a nitrogen atmosphere for 120 seconds, to thereby cure the polymerizable liquid crystal composition (A4). Regarding the optically anisotropic medium obtained in the aforementioned method, the incident angle dependence of phase difference was measured, and the result showed that the tilt angle to an air interface was about 0°. Also, on the optically anisotropic medium obtained in the aforementioned method, the polymerizable liquid crystal composition (A4) was spin-coated (3000 rpm, 30 seconds), and ultraviolet rays of 4 mW/cm² were irradiated in a nitrogen atmosphere for 120 seconds, to thereby cure the polymerizable liquid crystal composition (A4). Then, the favorable laminated optically anisotropic medium having no eye hole was obtained.

Comparative Example 1

To 98 mass % of polymerizable liquid crystal composition (A), 2.0 mass % of the photopolymerization initiator Irgacure-651 (manufactured by Ciba Specialty Chemicals Inc.) was added, to thereby prepare the polymerizable liquid crystal composition (A5). Subsequently, the xylene solution containing 33 mass % of the polymerizable liquid crystal composition (A5) was prepared. This xylene solution was spin-coated on the glass substrate with polyimide alignment layer (3,000 rpm, 30 seconds). Ultraviolet rays of 4 mW/cm² were irradiated to the spin-coated substrate in a nitrogen atmosphere for 120 seconds, to thereby cure the polymerizable liquid crystal composition (A5). Regarding the optically anisotropic medium obtained in the aforementioned method, the incident angle dependence of phase difference was measured, and the result showed that the tilt angle to an air interface was about 45°.

Comparative Example 2

To 97.7 mass % of polymerizable liquid crystal composition (A), 2.0 mass % of the photopolymerization initiator Irgacure-651 (manufactured by Ciba Specialty Chemicals Inc.) and 0.3 mass % of the surfactant FC171 (manufactured by 3M Co.) were added, to thereby prepare the polymerizable liquid crystal composition (A6) of the present invention. Subsequently, the xylene solution containing 33 mass % of the polymerizable liquid crystal composition (A6) was prepared. This xylene solution was spin-coated on the glass substrate with polyimide alignment layer (3,000 rpm, 30 seconds). Ultraviolet rays of 4 mW/cm² were irradiated to the spin-coated substrate in a nitrogen atmosphere for 120 seconds, to thereby cure the polymerizable liquid crystal composition (A6). Regarding the optically anisotropic medium obtained in the aforementioned method, the incident angle dependence of phase difference was measured, and the result showed that the tilt angle to an air interface was about 0°. Also, on the optically anisotropic medium obtained in the aforementioned method, the polymerizable liquid crystal composition (A6) was spin-coated (3000 rpm, 30 seconds). Then, eye holes occurred, and the favorable laminated optically anisotropic medium was not obtained.

Example 5

To 97.0 mass % of polymerizable liquid crystal composition (A), 2.0 mass % of the photopolymerization initiator Irgacure-651 (manufactured by Ciba Specialty Chemicals Inc.) and 1.0 mass % of polypropylene having a weight average molecular weight of 12,000 (manufactured by Sigma-Aldrich Co.) were added, to thereby prepare the polymerizable liquid crystal composition (A7) of the present invention. Subsequently, the xylene solution containing 33 mass % of the polymerizable liquid crystal composition (A7) was prepared. This xylene solution was spin-coated on the glass substrate with polyimide alignment layer (3,000 rpm, 30 seconds). Ultraviolet rays of 4 mW/cm² were irradiated to the spin-coated substrate in a nitrogen atmosphere for 120 seconds, to thereby cure the polymerizable liquid crystal composition (A7). Regarding the optically anisotropic medium obtained in the aforementioned method, the incident angle dependence of phase difference was measured, and the result showed that the tilt angle to an air interface was about 0°. The substrate with the optically anisotropic medium obtained in the aforementioned method was rubbed in the same direction as the slow axis of the optically anisotropic medium, and then was put together with the glass substrate with polyimide alignment layer in which the rubbing directions are perpendicular to each other and the spacing of 6 μm was kept, to thereby produce the TN cell. Into the produced cell, the liquid crystal (B) containing 20 mass % of the compound (c), 25 mass % of the compound (d), 20 mass % of the compound (e), 20 mass % of the compound (f), 7 mass % of the compound (g), and 8 mass % of the compound (h) was introduced, and the voltage-holding ratio was measured under the conditions of an applied voltage of 5 V, a frame time of 16.6 ms, a pulse-applying time 64 μs, and a temperature of 70° C. The result showed the voltage-holding ratio of 94.7%. The compounds (c) to (h) are shown as follows.

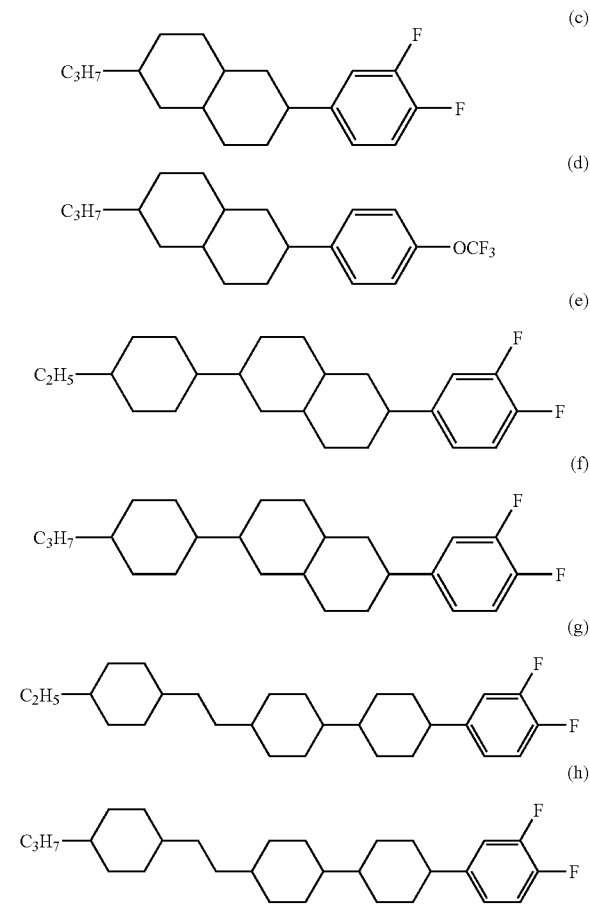

Comparative Example 3

To 97.0 mass % of polymerizable liquid crystal composition (A), 2.0 mass % of the photopolymerization initiator Irgacure-651 (manufactured by Ciba Specialty Chemicals Inc.) and 1.0 mass % of the surfactant FC171 (manufactured by 3M Co.) were added, to thereby prepare the polymerizable liquid crystal composition (A8) of the present invention. Subsequently, the xylene solution containing 33 mass % of the polymerizable liquid crystal composition (A8) was prepared. This xylene solution was spin-coated on the glass substrate with polyimide alignment layer (3,000 rpm, 30 seconds). Ultraviolet rays of 4 mW/cm² were irradiated to the spin-coated substrate in a nitrogen atmosphere for 120 seconds, to thereby cure the polymerizable liquid crystal composition (A8). Regarding the optically anisotropic medium obtained in the aforementioned method, the incident angle dependence of phase difference was measured, and the result showed that the tilt angle to an air interface was about 0°. The substrate with the optically anisotropic medium obtained in the aforementioned method was rubbed in the same direction as the slow axis of the optically anisotropic medium, and then was put together with the glass substrate with polyimide alignment layer in which the rubbing directions are perpendicular to each other and the spacing of 6 µm was kept, to thereby produce the TN cell. Into the produced cell, the liquid crystal (B) was introduced, and the voltage-holding ratio was measured under the conditions of an applied voltage of 5 V, a frame time of 16.6 ms, a pulse-applying time 64 µs, and a temperature of 70° C. The result showed the voltage-holding ratio of 89.2%.

It was found from the aforementioned Examples and Comparative Examples that the polymerizable liquid crystal composition including the compound including the repeated unit represented by the general formula (I), in which a weight average molecular weight is 100 or more, was able to reduce a tilt angle to an air interface. Also, it was found that, in the case where the optically anisotropic medium obtained by curing the polymerizable liquid crystal composition was incorporated inside the liquid crystal cell, the high voltage-holding ratio was showed in comparison with the optically anisotropic medium obtained by curing the surfactant-containing polymerizable liquid crystal composition. In addition, it was found that the laminated film can be easily formed. Therefore, a polymerizable liquid crystal composition of the present invention is preferable as a material of an optically anisotropic medium incorporated inside a liquid crystal cell.

INDUSTRIAL APPLICABILITY

A polymerizable liquid crystal composition of the present invention is preferably used for a material of an optically anisotropic medium incorporated inside a liquid crystal cell, and there is no risk of environmental toxicity. Therefore, the present invention is industrially useful.

The invention claimed is:

1. A polymerizable liquid crystal composition comprising: a compound including a repeated unit represented by a general formula (I)

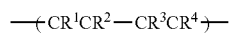

(wherein $R^1$, $R^2$, $R^3$, and $R^4$ each independently represents a hydrogen atom, a halogen atom, or a hydrocarbon group having 1 to 20 carbon atoms, and one or more of the hydrogen atoms in the hydrocarbon group may be substituted by the halogen atoms), in which a weight average molecular weight is 100 or more.

2. A polymerizable liquid crystal composition according to claim 1, wherein the weight average molecular weight of the compound represented by the general formula (I) is within a range of 200 to 1,000,000.

3. A polymerizable liquid crystal composition according to claim 1, wherein a content of the compound represented by the general formula (I) is within a range of 0.01 to 5 mass %.

4. A polymerizable liquid crystal composition according to claim 1, wherein the compound represented by the general formula (I) consists of carbon atoms and hydrogen atoms.

5. A polymerizable composition comprising the polymerizable liquid crystal composition according to claim 1 and an organic solvent.

6. A polymerizable liquid crystal composition according to claim 1, further comprising a compound represented by a general formula (II)

(wherein P represents a reactive functional group; Sp represents a spacer group having 1 to 20 carbon atoms; m represents 0 or 1; MG represents a mesogenic group or a mesogenic supporting group; and $R^1$ represents a halogen atom, a cyano group, or an alkyl group having 1 to 25 carbon atoms that may be substituted with one or more of the halogen atoms or CN, in which one of $CH_2$ group, or two or more of the $CH_2$ groups that are not adjacent may be each independently substituted by —O—, —S—, —NH—, —N(CH₃)—, —CO—, —COO—, —OCO—, —OCOO—, —SCO—, —COS—, or —C≡C— in a manner where the oxygen atoms are not directly bonded, or $R^1$ represents a structure represented by a general formula (II-a)

(wherein P represents the reactive functional group, Sp represents the spacer group having 1 to 20 carbon atoms, and m represents 0 or 1)).

7. A polymerizable liquid crystal composition according to claim 6, wherein in the general formula (II), Sp represents an alkylene group (the alkylene group may be substituted with one or more of the halogen atoms or CN, in which one of the $CH_2$ group, or two or more of the $CH_2$ groups that are not adjacent may be each independently substituted by —O—, —S—, —NH—, —N(CH₃)—, —CO—, —COO—, —OCO—, —OCOO—, —SCO—, —COS—, or —C≡C— in a manner where the oxygen atoms are not directly bonded);

MG represents a structure represented by a general formula (II-b)

(wherein A1, A2, and A3 each independently represents a 1,4-phenylene group, a 1,4-cyclohexylene group, a 1,4-cyclohexenyl group, a tetrahydropyran-2,5-diyl group, a 1,3-dioxan-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphtylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group, in which the 1,4-cyclohexylene group, the 1,2,3,4-tetrahydronaphtha-lene-2,6-diyl group, the 2,6-naphtylene group, the phenanthrene-2,7-diyl group, the 9,10-dihydrophenan-threne-2,7-diyl group, the 1,2,3,4,4a,9,10a-octahydro-phenanthrene-2,7-diyl group, and the fluorene-2,7-diyl group may contain, as a substituent group, F, Cl, CF₃, OCF$_3$, a cyano group, an alkyl group, alkoxy group, alkanoyl group, or alkanoyloxy group which has 1 to 8 carbon atoms, or an alkenyl group, alkenyloxy group, alkenyl group, or alkenoyloxy group which has 2 to 8 carbon atoms; Z0, Z1, Z2, and Z3 each independently represents —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, or a single bond; and n represents 0, 1, or 2); and P represents a reactive functional group selected from the group consisting of substituent groups represented by a general formula (II-c), a general formula (II-d), and a general formula (II-e)

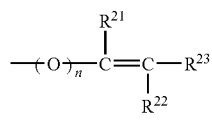

(II-c)

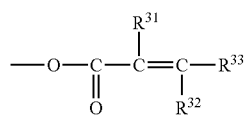

(II-d)

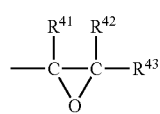

(II-e)

(where R$^{21}$, R$^{22}$, R$^{23}$, R$^{31}$, R$^{32}$, R$^{33}$, R$^{41}$, R$^{42}$, and R$^{43}$ each independently represents a hydrogen atom, a halogen atom, or an alkyl group having 1 to 5 carbon atoms, and n represents 0 or 1).

8. A polymerizable liquid crystal composition according to claim 7, further comprising a compound represented by a general formula (III)

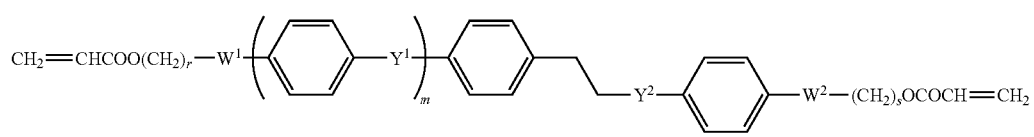

(III)

(wherein m represents 0 or 1, W$^1$ and W$^2$ each independently represents a single bond, —O—, —COO—, or —OCO—; Y$^1$ and Y$^2$ each independently represents —COO— or —OCO—; and r and s each independently represents an integer of 2 to 18, and the 1,4-phenylene group in the formula may be substituted with one or more of an alkyl group, alkoxy group, or alkanoyl group which has 1 to 7 carbon atoms, a cyano group, or a halogen atom).

9. A polymerizable liquid crystal composition according to claim 7, further comprising a compound represented by a general formula (IV)

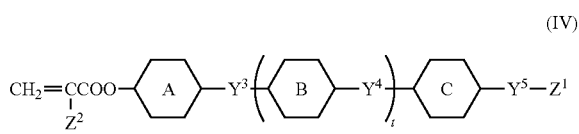

(IV)

(wherein Z$^1$ represents a hydrogen atom, a halogen atom, a cyano group, or a hydrocarbon group having 1 to 20 carbon atoms; Z$^2$ represents a hydrogen atom or a methyl group; t represents 0 or 1; A, B, and C each independently represents a 1,4-phenylene group, a 1,4-phenylene group in which CH groups that are not adjacent are substituted by nitrogen, a 1,4-cyclohexylene group, a 1,4-cyclohexylene group in which one, or two CH$_2$ groups that are not adjacent are substituted by oxygen atoms or sulfur atoms, or a 1,4-cyclohexenylene group, and the 1,4-phenylene group in the formula may be substituted with one or more of an alkyl group, alkoxy group, or alkanoyl group which has 1 to 7 carbon atoms, a cyano group, or a halogen atom; Y$^3$ and Y$^4$ each independently represents a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH=CHCH$_2$CH$_2$—, —CH$_2$CH$_2$CH=CH—, —CH=CHCOO—, —OCOCH=CH—, —CH$_2$CH$_2$COO—, —CH$_2$CH$_2$OCO—, —COOCH$_2$CH$_2$—, or —OCOCH$_2$CH$_2$—; and Y$^8$ represents single bond, —O—, —COO—, —OCO—, or —CH=CHCOO—).

10. A polymerizable liquid crystal composition according to claim 7, further comprising a compound represented by a general formula (V)

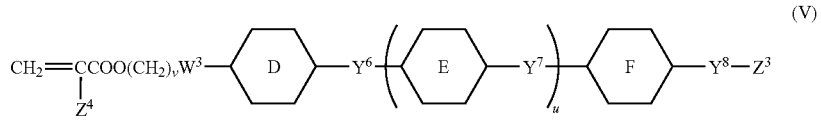

(V)

(wherein $Z^3$ represents a hydrogen atom, a halogen atom, a cyano group, or a hydrocarbon group having 1 to 20 carbon atoms; $Z^4$ represents a hydrogen atom or a methyl group; $W^3$ represents a single bond, —O—, —COO—, or —OCO—; v represents an integer of 2 to 18; u represents 0 or 1; D, E, and F each independently represents a 1,4-phenylene group, a 1,4-phenylene group in which CH groups that are not adjacent are substituted by nitrogen, a 1,4-cyclohexylene group, a 1,4-cyclohexylene group in which one, or two $CH_2$ groups that are not adjacent are substituted by oxygen atoms or sulfur atoms, or a 1,4-cyclohexenylene group, and the 1,4-phenylene group in the formula may be substituted with one or more of an alkyl group, alkoxy group, or alkanoyl group which has 1 to 7 carbon atoms, a cyano group, or a halogen atom; $Y^6$ and $Y^7$ each independently represents a single bond, —$CH_2CH_2$—, —$CH_2O$—, —$OCH_2$—, —COO—, —OCO—, —C≡C—, —CH=CH—, —CF=CF—, —$(CH_2)_4$—, —$CH_2CH_2CH_2O$—, —$OCH_2CH_2CH_2$—, —$CH=CHCH_2CH_2$—, —$CH_2CH_2CH=CH$—, —CH=CHCOO—, —OCOCH=CH—, —$CH_2CH_2COO$—, —$CH_2CH_2OCO$—, —$COOCH_2CH_2$—, or —$OCOCH_2CH_2$—; and $Y^8$ represents a single bond, —O—, —COO—, —OCO—, or —CH=CHCOO—).

11. A polymerizable liquid crystal composition according to claim 1, further comprising a discotic liquid crystal compound having a structure in which a main structure of the center of molecule is a benzene derivative, a triphenylene derivative, a tolxene derivative, a phthalocyanine derivative, or a cyclohexane derivative, and side chains, with which the main structure is radially substituted, are linear alkyl groups, linear alkoxy groups, or substitution benzoyloxy groups.

12. A polymerizable liquid crystal composition according to claim 11, wherein the discotic liquid crystal compound is represented by a general formula (VI)

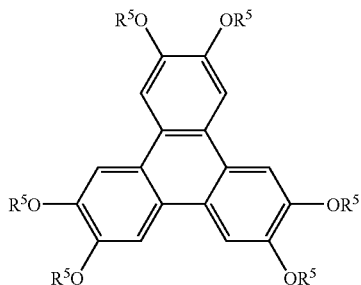

(VI)

(wherein $R^5$ each independently represents a substituent group represented by a general formula (VI-a))

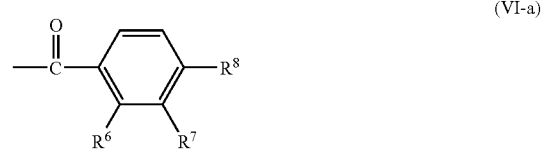

(VI-a)

(wherein $R^6$ and $R^7$ each independently represents a hydrogen atom, a halogen atom, or a methyl group, $R^8$ represents an alkoxy group having 1 to 20 carbon atoms, and a hydrogen atom in the alkoxy group may be substituted by a substituent group represented by a general formula (VI-b), a general formula (VI-c), or a general formula (VI-d))

(VI-b)

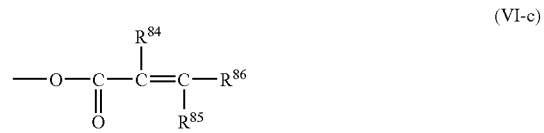

(VI-c)

(VI-d)

(wherein $R^{81}$, $R^{82}$, $R^{83}$, $R^{84}$, $R^{85}$, $R^{86}$, $R^{87}$, $R^{88}$, and $R^{89}$ each independently represents a hydrogen atom, a halogen atom, or an alkyl group having 1 to 5 carbon atoms, and n represents 0 or 1).

13. An optically anisotropic medium formed from a polymer of the polymerizable liquid crystal composition according to any one of claims 1 to 12.

* * * * *